Figure 1:
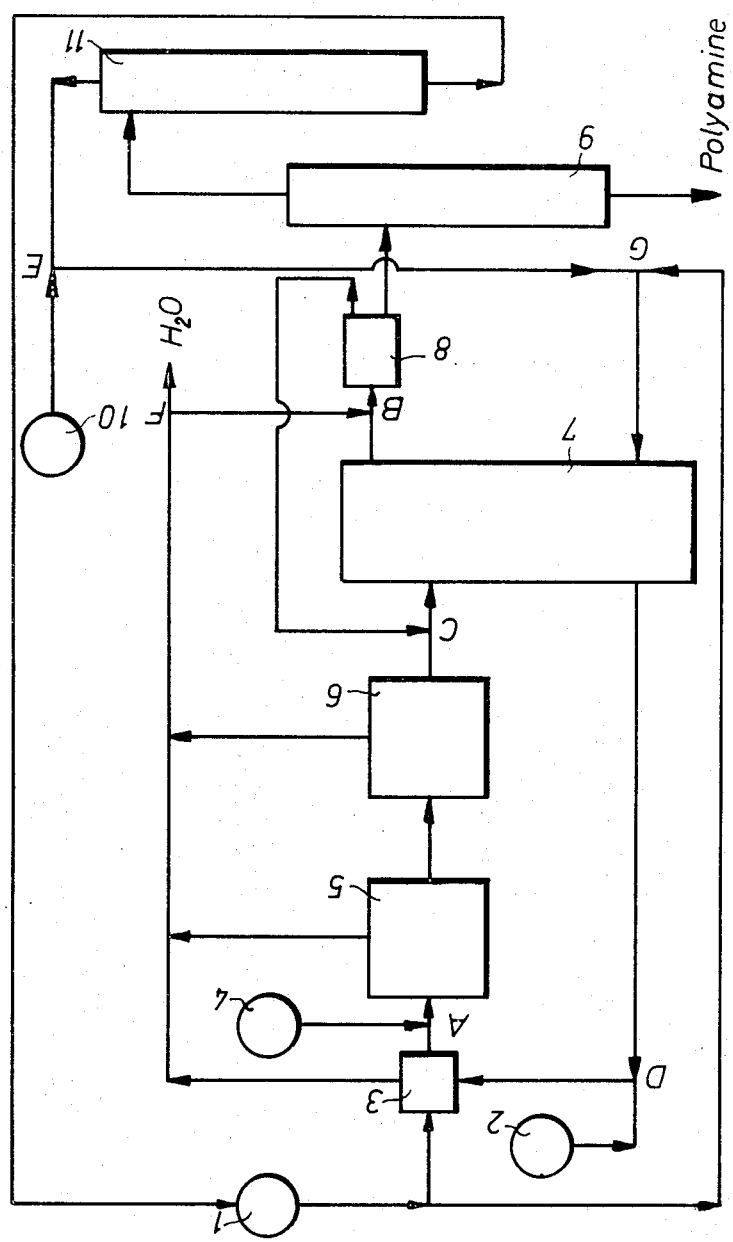

| United States Patent [19] | [11] | 3,996,283 |
|---|---|---|
| Knofel | [45] | Dec. 7, 1976 |

[54] PROCESS FOR THE PRODUCTION OF POLYAMINES

[75] Inventor: Hartmut Knofel, Leverkusen, Germany

[73] Assignee: Bayer Aktiengesellschaft, Leverkusen, Germany

[22] Filed: July 30, 1973

[21] Appl. No.: 383,921

[30] Foreign Application Priority Data

Aug. 4, 1972  Germany .......................... 2238379
Mar. 29, 1973  Germany .......................... 2238920

[52] U.S. Cl. .................... 260/570 D; 260/453 AM; 260/471 R
[51] Int. Cl.$^2$ ......................................... C07C 87/28
[58] Field of Search .................... 260/570 D, 471 R

[56] References Cited

UNITED STATES PATENTS

| 1,954,484 | 4/1934 | Mattison ......................... 260/570 D |
| 2,818,433 | 12/1957 | Erickson ............................ 260/570 |
| 2,938,054 | 5/1960 | Demers et al. ................ 260/570 D |
| 3,175,007 | 3/1965 | Berhenke .................... 260/570 UX |
| 3,358,025 | 12/1967 | Foster et al. .................. 260/570 D |
| 3,478,099 | 11/1969 | Ross et al. .......................... 260/570 |
| 3,496,229 | 2/1970 | Powers et al. ..................... 260/570 |
| 3,728,310 | 4/1973 | Sundholm et al. ............. 260/570 X |

FOREIGN PATENTS OR APPLICATIONS 1,228,495  11/1969  United Kingdom ............... 260/570

OTHER PUBLICATIONS

Beilsteins, "Handbuch der Organischen Chemie", XIII, pp. 70–71 and 237–239.

*Primary Examiner*—Robert V. Hines
*Attorney, Agent, or Firm*—Joseph C. Gil; Gene Harsh

[57] ABSTRACT

An improved process for the production of multinuclear aromatic polyamines by condensing an aromatic amine with formaldehyde in the presence of an acid catalyst, obtaining the condensation product in an aqueous medium and then extracting the aqueous condensation mixture with a hydrophobic solvent in order to obtain a solvent phase and a separate aqueous phase. Thereafter polyamine product is recovered from the solvent phase. If desired, polyamine product can be obtained from both the solvent phase and the aqueous phase. Alternatively, the aqueous phase can be recycled to the initial condensation step, thus providing a continuous process without loss of acid catalysts.

13 Claims, 2 Drawing Figures

PROCESS FOR THE PRODUCTION OF POLYAMINES

The production of polyamines of the diamino-diphenylmethane series by condensation of aromatic amines with formaldehyde in the presence of acid catalysts has been variously described and the products obtained vary in their composition according to the particular procedure employed. Condensation in the presence of weak acid catalysts or traces of strong acid catalysts yields polyamine mixtures which contain a high proportion of 2,4'-diamino-diarylmethanes whereas polyamines which contain a high proportion of 4,4'-diamino-diarylmethanes and only a low proportion of 2,4'-isomers can only be prepared in the presence of substantial quantities of strong acid catalysts. While 4,4'-isomers are usually the most desired type product, propylamine product mixtures having either a high or low 2,4'-isomer content, depending upon the intended field of application, are also desirable. According to the present state of the art, however, if both high and low 2,4'-isomer content products are required, it is necessary to carry out separate condensation processes for the preparation of each.

Additionally when large quantities of a strong acid are employed to obtain a high proportion of 4,4'-isomer or when only small quantities of a strong acid are employed to obtain a high content of 2,4'-isomer the most suitable strong acids for these purposes are strong mineral acids and particularly hydrochloric acid. In the known methods of the art, however, the advantage of the high selectivity of strong mineral acids for the formation of 4,4'-isomers is offset by loss of catalyst since, at the end of the reaction, the catalyst must be removed from the reaction mixture by an expensive process of neutralisation with bases. Another disadvantage of the known processes of the art is that the salt solutions resulting from this neutralisation reaction have no suitable commercial application and give rise to considerable environmental problems.

This invention relates to an improved process for the production of multinuclear aromatic polyamines by condensing aromatic amines with formaldehyde in the presence of an acid catalyst, characterised in that a. after completion of the condensation reaction, the condensation mixture is obtained in an aqueous medium and is extracted with a hydrophobic solvent, to provide a solvent phase and a separate aqueous phase, and b. the resulting solvent phase is treated in known manner to isolate the polyamines.

It is also within the scope of this invention to recover polyamines from the separate aqueous phase thereby obtaining a product with a comparatively low 2,4'-isomer content. This is particularly advantageous when condensing aniline with formaldehyde to produce diamino-diphenylmethanes wherein the percentage of 2,4'-isomer in the solvent phase is at least 2 and generally is at least 4 times the percentage of the 2,4'-isomer in the aqueous phase, based on condensation product.

In another aspect of this invention the aqueous phase, which contains the total quantity of acid catalysts in the form of ammonium salts, is returned to the beginning of the cycle, i.e. the condensation step. In this mode of operation aromatic amine, preferably of the type employed in the condensation step, can also be added to the condensation product reaction mixture before extraction.

The recycling of the aqueous phase to the condensation step not only permits of a continuous process but also assures following advantages:
  salt-free waste water
  reuse of catalyst this means practically no catalyst consumption
  no consumption of neutralizing agents for the catalyst
  no special apparatus for the neutralization reaction
which is necessary in most processes of the art for preparing aniline/formaldehyde condensates in the presence of strong acid catalysts.

The condensation reaction according to the invention can be carried out by known methods of the art and the molar ratios of arylamine to formaldehyde and arylamine to acid catalyst may be selected from within wide limits. Suitable molar ratios of arylamine to formaldehyde are within the range of 20:1 to 1:1 in particular within the range of 10:1 to 1:1 and preferably within the range of 4:1 to 1, 8:1 and suitable molar ratios of arylamine to catalyst are within the range of 20:1 to 1:1 preferably 5:1 to 1:1. The last mentioned ratio also prevails as the ratio of arylamine put into the process at the beginning to the quantity of acid present in the cycle in the form of ammonium salts. In view of the ratio of arylamine to catalyst of 1:1 it is also possible to carry out the process of the invention solely with the aqueous solution which is recycled and which contains ammonium salts of the arylamine without adding any further free arylamine to this aqueous solution.

Any aromatic amines can be used in the process according to the invention, for example aniline, o-toluidine, m-toluidine, N-methylaniline, N-ethylaniline, 2,6-dimethyl aniline, 2,6-diethylaniline, 2,6-diisopropylaniline, 2,4-diaminotoluene or any mixtures of such amines. Suitable amines are also anthranilic acid alkylesters having 1 to 4 carbon atoms in the alkyl chain. The preferred arylamine for the process according to the invention is aniline.

The acid catalysts used for the process according to the invention are water-soluble acids with a pKa value below 2.5 and preferably below 1.5, for example hydrochloric acid, hydrobromic acid, sulphuric acid, trifluoroacetic acid, methane sulphonic acid, trifluoromethanesulphonic acid, benzene sulphonic acid or phosphoric acid. Hydrochloric acid is the preferred catalyst. The above mentioned acids can also be used in admixture with acid or neutral salts of such acids, e.g. the corresponding ammonium salts or the corresponding alkali metal salts. If desired, the ammonium salts formed from the aforesaid acids and from the arylamine used as starting material can of course be used as the only catalysts right from the beginning of the process.

The hydrophobic solvents used for the process according to the invention can be any solvents with boiling points approximately within the range from about 30° C to about 250° C and preferably from about 80° to about 200° C which are practically immiscible with water this means in which at most 10% by weight preferably at most 5% by weight of water are soluble at 20° C and which are miscible with aniline in any ratio. The preferred solvents have densities which differ from the density of water (1kg/l) by at least ± 0.05 kg/l and inert towards the reactants. The following are examples of particularly suitable solvents: halogenated aromatic solvents having 1 – 3 halogen atoms and 6 – 10 carbon atoms such as chlorobenzene, dichlorobenzenes, bromobenzene, dibromobenzenes, iodobenzene, aromatic solvents and alkylated derivatives thereof having 6 – 12 carbon atoms such as benzene, toluene, xylenes, halogenated aliphatic solvents having 1 – 6 halogen atoms and 1 – 4 carbon atoms such as 1,2-dichloroethane, 1,1-dichloroethane, 1,1,2,2-tetrachloroethane, ethylchloride, ethylbromide, 1,2-dibromethane, methyljodide, methylene chloride, chloroform, carbontetrachloride, 1,2-dichloropropane, 1,3-dichlorobutane, halogenated olefinic hydrocarbons such as tetrachloroethylene. Aliphatic hydrocarbons or aliphatic ethers containing 5 – 10 carbon atoms may in principle also be used. For extraction, the solvents are used in quantities corresponding to a volumetric ratio of acid condensation mixture to solvent of between 5:1 and 1:10, preferably 1:1 to 1:5.

The acid condensation mixture may be prepared in known manner by mixing an aromatic amine and an acid catalyst with formaldehyde, or substances which give off formaldehyde, and heating the mixture to elevated temperatures to effect molecular rearrangement of the precondensates formed. It may also be prepared conversely by first reacting the aromatic amine with formaldehyde and then adding the catalyst. In either case it is immaterial whether the reaction is carried out in the presence of water or with exclusion of water and in either case the acid condensation mixture is suitable for solvent extraction by the process according to the invention, water being added to the acid condensation mixture before extraction if condensation is carried out anhydrously. In the embodiment of the invention wherein the aqueous phase is recycled to the beginning of the condensation reaction water is, of course, automatically present at the very beginning of the process.

The volumetric ratio of water to arylamine before extraction is generally in the region of 0.2:1 to 3:1.

The proportion of substance extracted from the acid condensation mixture depends on the molar ratio of the arylamine and catalyst used as starting material and increases with increasing molar ratio of arylamine to catalyst. In addition, the proportion which can be extracted with a given ratio of arylamine to catalyst in the starting mixture can be increased by subsequently adding aromatic amine after condensation has been completed. This is particularly advisable if the amine/catalyst ratio is low. The 2,4'-isomer, especially 2,4'-diamino-diphenylmethane, can in this way be removed almost completely from the acid polyamine mixture. The quantity of amine subsequently added is generally 0 to 600% by weight, preferably 0 to 300% by weight and most preferably 50 to 300% based on the total quantity of solvent-free mixture of organic compounds put into the extraction process. If a certain amount of catalysts loss can be tolerated, it is within the scope of this invention, although not preferred, to increase the extractable portion not by the addition of an arylamine but by the addition of some other weak organic base, e.g. 4,4'-diamino-diphenylmethane or a less than equivalent quantity of a medium to strong base, based on the acid catalysts which may be added in admixture with an arylamine or a solvent. These bases may be ammonia, alkylamines or sodium hydroxide solution.

The extraction may be carried out at room temperature or at a higher temperature, preferably near the boiling point of the mixture. Typical ranges of operating temperatures for the extraction are from about 20° to about 100° C and preferably from about 60° to about 100° C.

Water of condensation and excess water entering the system with the starting materials as well as by-products (e.g. methanol from formalin) can be discharged from the system at some suitable point. Such points are e.g. the heating stage at which the condensation reaction is completed, the precondensation stage or an evaporator attached to the upstream end of the precondensation stage.

The process according to the invention is distinguished by the following advantages: Simultaneous preparation of polyamines with a high 2,4'-diamino isomer content and also with a low 2,4'-diamino isomer content (particularly in connection with diaminodiphenylmethanes) thereby eliminating the necessity for separate, duplicate apparatus; reduced salt content to salt free effluent water; reduction in, to elimination of, consumption of acid catalysts; reduction in, to elimination of, alkalizing agent and elimination of neutralization apparatus as well as other economic advantages.

The accompanying FIG. 1 serves to illustrate by way of example an apparatus suitable for carrying out one aspect of the process according to the invention. The process of the ivention will now be described more fully with reference to FIG. 1:

A measured and regulated stream of aromatic amine from container 1 and the acid aqueous phase from extractor 7 are combined in the mixer 3 and a measured and regulated stream of formaldehyde from container 4 is added to the mixture at A. The mixture enters reactor 5 in which the periphery reaction takes place and from there it flows into reactor 6 in which condensation is completed. The acid aqueous condensation mixture then enters extractor 7 where it is extracted with solvents circulated in the cycle. Solvent losses are replaced from container 10. The solvent phase which contains the free polyamines in solution is washed at B with water obtained by evaporation from the reactors 5 or 6 or from the mixer 3, freed from wash water in the separator 8 and carried to the evaporator 9 in which the polyamine constitutes the sump product. The mixture of solvent and arylamine obtained at the head of the evaporator 9 is separated by distillation in the column 11. The arylamine obtained as sump returns to container 1 and the solvent distilled off at the top is recycled to the extractor 7 as is the wash water removed in the separator 8. The second phase, which is formed in the extractor 7, contains the catalyst in the form of amine salts and water and is returned to the mixer 3. Catalyst losses are covered by replacement from the container 2. Additional arylamine may be supplied to the extractor 7 from container 1 to adjust the basicity and solvent equilibria. The water which may be introduced e.g. with formaldehyde as formalin and the water formed by condensation are removed by vacuum evaporated in the mixer 3 or in the reactor 5 or by evaporation at normal pressure in the reactor 6. The temperatures are preferably adjusted as follows: 20° to 60° C in mixer 3, 20° to 50° C in reactor 5, 80° to 105° C in reactor 6, 70° to 100° C in extractor 7 and 60° to 100° C in separator 8.

Figure 2:
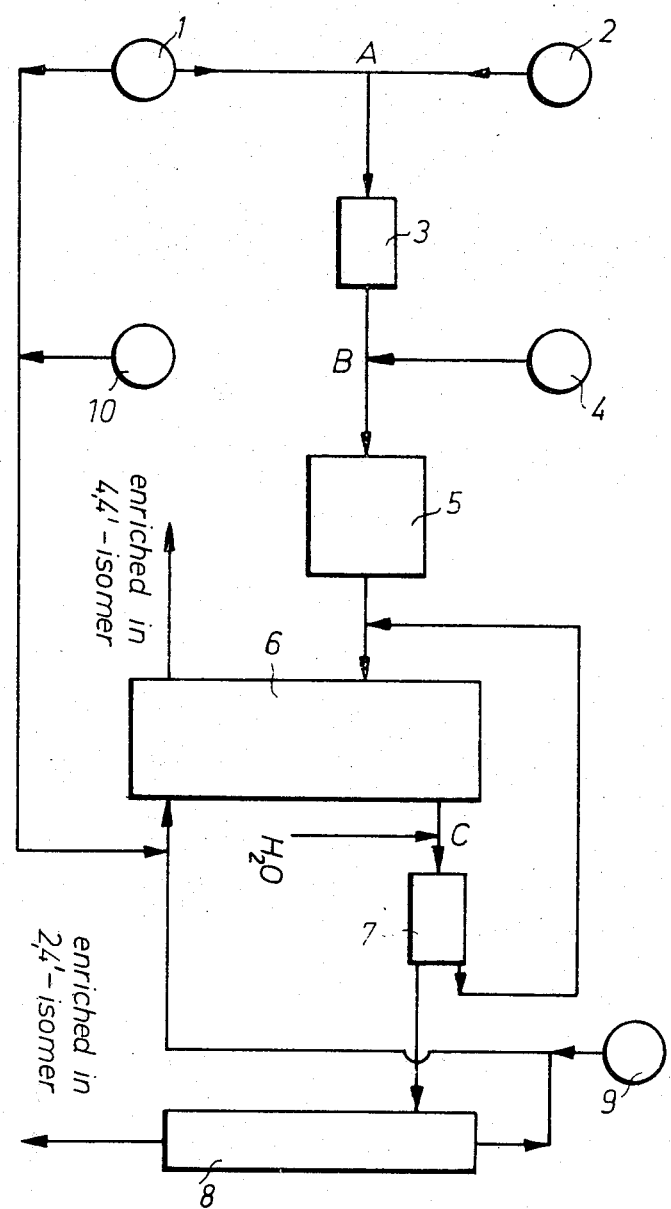

Another aspect of this invention which can be practiced in a modified form of the above described apparatus is the simultaneous production of both high and low concentrations of the 2,4'-isomers, particularly 2,4'-diamino-diphenylmethane. This embodiment of the process of the invention may e.g. be carried out in an apparatus as illustrated in FIG. 2. In such aspect a measured and regulated stream of aniline from container 1 and acid catalyst from container 2 are combined at A and a measured and regulated stream of formaldehyde from container 4 is added to the mixture which is optionally cooled in heat-exchanger 3 at B. The reaction mixture enters reactor 5 which may also be a two-stage reactor and from there it flows into extractor 6 in which it is extracted with solvent which is circulated and the losses of which are replaced by solvent from container 9. The solvent phase in which the 2,4'-isomer is concentrated is mixed with water at point C to wash it, is next separated from the wash water in separator 7 and is then conveyed to the evaporator 8 in which the polyamine enriched in 2,4'-isomer is discharged in the sump. The solvent obtained at the head of the evaporator 8 is recycled directly to the extractor 6. Wash water separated in the separator 7 is also recycled to extractor 6. The second phase obtained in the extractor 6 which contains the product enriched with 4,4'-isomer and low 2,4'-isomer content, the catalyst and water is processed with alkaline reagents to isolate the polyamines by known methods of the art (not shown). The basicity and solvent equilibria can be influenced by adding additional aniline from container 1 or some other base from container 10 to the extractor 6.

The process according to the invention may, of course, be carried out quite independently of the apparatuses which have been illustrated merely by way of example in the FIGS. 1 and 2. This means in particular that the acid catalyzed condensation of the amine and formaldehyde may also be carried out as a single stage process (without the precondensation stage), either continuously or intermittently. The essential principle of the invention lies in the extraction by means of hydrophobic solvents of polyamine which has not been protonized and the re-use of the aqueous phase which contains the catalyst in the form of ammonium salts resp. in the separate isolation of the polyamines contained in the aqueous phase thus providing a product which is enriched in 4,4'-isomer. In the first embodiment it is in principle possible to introduce the aryl amine starting material at any spot of the cycle. For instance the aryl amine can be added at the beginning of the reaction together with the formaldehyde, in the course of the condensation e.g. between a precondensation and final condensation, if the condensation reaction is carried out in two steps or simply by adding a relatively large amount of aryl amine to the solvent which is used for the extraction. The consequence of this would be that also free amine is present in the aqueous phase together with the ammonium salts since these salts act as aid to solution for the free aryl amine in water. Multistage extraction can also be carried out using pure solvent at the last stage thus providing aqueous systems which do not only contain ammonium salts (molar ratio aryl amine:HCL=1:1). This latter procedure is, preferably carried out in the embodiment of the invention where the aqueous phase is recycled to the beginning of the process.

The primary polyamines obtained by the process according to the invention may be reacted with phosgene to produce isocyanates by the known methods of the art. The products which have a high 2,4'-diaminodiphenylmethane content may also be used directly as cross-linking agents for epoxides or for modified isocyanates.

The following Examples explain the invention.

EXAMPLE 1 (see FIG. 1)

4 Parts by volume of aniline from container 1 and the aqueous hydrochloric acid solution of amine from extractor 7 are conveyed into the mixer 3 under a pressure of 50 mm Hg, the temperature in the mixer 3 settling at 40° C. The water evaporating from the mixer 3 is fed into the separator 8 at B. 2 Parts by volume of 30% aqueous formalin from container 4 are supplied to the mixture of aniline, hydrochloric acid and water at A to result in a mixture with an aniline/HCl molar ratio or 4:1 and an aniline/formaldehyde molar ratio of 2:1. The hydrochloric acid in the system is originally introduced at D from container 2 and is cycled through the apparatus. The mixture formed at A enters the reactor 5 which has been evacuated to 50 mm Hg and the distillate from the reactor 5 is combined with that from the mixer 3. The reaction mixture leaving the reactor 5 at 40° C enters the heated reactor 6 and flows from there into the extractor 7 where it is extracted with chlorobenzene at 90° C. The aqueous phase which separates is returned to the cycle by way of the mixer 3 and the organic phase is washed with water introduced at B from the parts of the apparatus 3 and 5 and is then introduced into the separator 8. The aqueous phase which separates in the separator 8 is returned to the extractor 7 at C while the organic phase flows into the distillation column 9 where chlorobenzene and aniline are separated from polyamine. The distillate from the column 9 is separated in the column 11 into aniline and chlorobenzene. The chlorobenzene is returned to the cycle at G and aniline returns to the container 1. The chlorobenzene in the cycle is originally charged into the apparatus from the container 10 at E. The parts by volume of chlorobenzene and acid condensation mixture fed into the extractor 7 are in the ratio of 1:1. The water introduced with formalin and water of condensation are discharged from the cycle at F so that the water content in the plant remains constant. The polyamine leaving the column 9 has the following composition:
5% of 2,4'-diamino-diphenylmethane,
53% of 4,4'-diamino-diphenylmethane,
22% of triamines.

EXAMPLE 2

The procedure is the same as that described in Example 1 but the quantity of formalin is reduced to half. A polyamine having the following composition is obtained:
14% of 2,4'-diamino-diphenylmethane,
70% of 4,4'-diamino-diphenylmethane and
13% of triamines.

EXAMPLE 3

The procedure is the same as described in Example 1 but the aniline/HCl molar ratio is reduced from 4:1 to 2:1 and at the same time twice the quantity of aniline introduced into mixer 3 from container 1 is fed into extractor 7 from G. A polyamine having the following composition is obtained:
3.0% of 2,4'-diamino-diphenylmethane,
57.0% of 4,4'-diamino-diphenylmethane, and
19.0% of triamines.

EXAMPLE 4

The procedure is the same as that described in Example 1 but aniline is replaced by an equal molar quantity of N-methylaniline.

A polyamine having the following composition is obtained:
77.3% of diamines,
20.7% of triamines,
1.6% of tetramines.

EXAMPLE 5

The procedure is the same as that described in Example 1 but chlorobenzene is replaced by 1,2-dichloroethane. A polyamine having the following composition is obtained:
5.5% of 2,4'-diamino-diphenylmethane,
52% of 4,4'-diamino-diphenylmethane,
24.5% of triamines.

EXAMPLE 6

The procedure is the same as that described in Example 1 but chlorobenzene is replaced by toluene. A polyamine having the following composition is obtained:
6.1% of 2,4'-diamino-diphenylmethane,
52.3% of 4,4'-diamino-diphenylmethane,
21% of triamines.

The following series of examples illustrate the aspect of the invention relating to the simultaneous production of high and low 2,4'-isomer concentrations.

EXAMPLE 7

300 ml of aniline and 150 ml of 30% aqueous hydrochloric acid are mixed and 75 ml of a 30% aqueous formalin solution are added at 40° C. The reaction mixture is heated to boiling and kept under reflux for one hour. The homogeneous phase is then extracted by shaking it once with 500 ml of chlorobenzene for 15 minutes at 95° C. The solvent phase is washed with water and concentrated by evaporation under vacuum. 20 g of polyamines are obtained (for composition see Table 1).

The aqueous phase is rendered alkaline with sodium hydroxide solution and the polyamine solution is separated off and concentrated by evaporation under vacuum. 127 g of polyamines are obtained (for composition see Table 1).

EXAMPLES 8–12

Separation of the products is achieved in a similar manner to that of Example 7 by extraction with 500 ml of toluene, chloroform, 1,2-dichloroethane, 1,2-dichlorobenzene or chloroform (Table 1).

EXAMPLE 13

The process is similar to that described in Example 7 but 300 ml of aniline, 75 ml of hydrochloric acid and 150 ml of formalin are used. The acid condensation mixture is extracted twice, each time with 500 ml of chlorobenzene, as described in Example 7. The results are shown in Table 2.

EXAMPLE 14

The procedure is similar to that described in Example 7 but 300 ml of aniline are added to the chlorobenzene. The results are shown in Table 2.

EXAMPLE 15

The procedure is similar to that described in Example 7 but 20 ml of 50% sodium hydroxide solution are added to the chlorobenzene. The results are shown in Table 2.

Table 1

| Polyamine constituents (% by weight) | Example 7 Chlorobenzene | | Example 8 1,2-dichlorobenzene | | Example 9 Toluene | | Example 10 Chloroform | | Example 11 Carbon tetrachloride | | Example 12 1,2-dichloroethane | |
|---|---|---|---|---|---|---|---|---|---|---|---|---|
| | SP 20g | AP 127g | SP 20g | AP 124g | SP 16g | AP 130g | SP 23g | AP 121g | SP 7g | AP 140g | SP 27g | AP 117g |
| 2,2'-Diamino-diphenylmethane | 1.1 | — | 1.5 | — | 1.8 | — | 1.3 | — | 2.5 | 0.1 | 1.0 | — |
| 2,4'-Diamino-diphenylmethane | 19.5 | 3.8 | 22.9 | 5.0 | 25.1 | 5.2 | 23.8 | 4.3 | 29.5 | 6.4 | 19.8 | 3.8 |
| 4,4'-Diamino-diphenylmethane | 61.7 | 79.4 | 60.0 | 78.2 | 57.4 | 77.7 | 59.1 | 80.9 | 53.8 | 77.7 | 53.2 | 65.4 |
| Triamines | 8.4 | 11.1 | 10.1 | 13.1 | 7.9 | 13.5 | 11.7 | 12.9 | 7.1 | 12.5 | 15.0 | 23.8 |

SP – solvent phase
AP – aqueous phase

Table 2

| Polyamine constituents (% by weight) | Example 13 SP 123g | AP 102g | Example 14 SP 78g | AP 75g | Example 15 SP 122g | AP 22g |
|---|---|---|---|---|---|---|
| 2,2'-Diamino-diphenylmethane | 0.1 | — | 0.5 | — | 0.3 | — |
| 2,4'-Diamino-diphenylmethane | 5.4 | 0.6 | 13.6 | 3.5 | 9.2 | 1.9 |
| 4,4'-Diamino-diphenylmethane | 51.3 | 52.5 | 70.0 | 82.0 | 73.9 | 91.0 |
| Triamines | 24.6 | 24.7 | 10.4 | 10.0 | 14.4 | 7.0 |

What is claimed is:
1. A process for the preparation of a multinuclear aromatic polyamine which comprises the steps of
   a. condensing an aromaic amine with formaldehyde in the presence of an aqueous acid catalyst to obtain the condensation mixture as an aqueous phase,
   b. extracting the aqueous condensation mixture with a hydrophobic solvent to provide a solvent phase and a separate aqueous phase containing the acid catalyst as ammonium salts of said aromaic amine,
   c. recovering polyamine from the solvent phase and
   d. returning said aqueous phase containing the acid ammonium salt catalyst to step a.
2. The process of claim 1 wherein the condensation is conducted in the presence of water.
3. The process of claim 1 wherein the volume ratio of aqueous condensation mixture to solvent is from about 5:1 to about 1:10.
4. The process of claim 1 wherein, after completion of condensation and before extraction, additional aromatic amine is added to the condensation mixture in a quantity of from about 50% up to about 500% by weight, based on the quantity of organic compounds in the condensation mixture.
5. The process of claim 1 wherein the solvent phase is washed with water.

6. The process of claim 1 wherein the acid catalyst is hydrochloric acid.

7. The process of claim 1 wherein the molar ratio of aromatic amine to formaldehyde is from about 20:1 to about 1:1.

8. The process of claim 1 wherein the molar ratio of aromatic amine to acid catalyst is from about 20:1 to about 1:1.

9. The process of claim 1 wherein, after completion of the condensation and before the extraction, additional aromatic amine is added to the condensation mixture.

10. A process for the preparation of separate polyamines which have a high and a low 2,4'-diaminodiarylmethane content which comprises the steps of
 a. condensing an aromatic amine with formaldehyde in the presence of an aqueous acid catalyst to obtain the condensation mixture as an aqueous phase,
 b. extracting the aqueous condensation phase with a hydrophobic solvent to provide a solvent phase and a separate aqueous phase and
 c. separately recovering
  i. polyamines having a high 2,4'-isomer content from said solvent phase and
  ii. polyamines having a low 2,4'-isomer content from said aqueous phase.

11. The process of claim 10, wherein said aromatic amine is aniline and said acid catalyst is HCl.

12. The process of claim 10, wherein said acid catalyst has a pKa value below 2.5.

13. The process of claim 10 wherein, after completion of the condensation and before extraction, a material selected from the group consisting of aniline and bases is added to the condensation mixture.

* * * * *